United States Patent [19]
Schoeneberger

[11] 3,958,399
[45] May 25, 1976

[54] HEADER ATTACHMENT STRUCTURE

[75] Inventor: Ernest A. Schoeneberger, Leola, Pa.

[73] Assignee: Sperry Rand Corporation, New Holland, Pa.

[22] Filed: Feb. 18, 1975

[21] Appl. No.: 550,335

[52] U.S. Cl. ............................. 56/15.8; 56/14.4; 56/208
[51] Int. Cl.² ................................. A01D 47/00
[58] Field of Search ............... 56/208, 15.8, DIG. 1, 56/DIG. 9, 14.9, 14.3–14.5, DIG. 10

[56] References Cited
UNITED STATES PATENTS

| | | | |
|---|---|---|---|
| 2,680,015 | 6/1954 | Andrews et al. | 56/208 X |
| 3,699,754 | 10/1972 | Koch et al. | 56/15.8 |

*Primary Examiner*—J. N. Eskovitz
*Attorney, Agent, or Firm*—John R. Flanagan; Frank A. Seemar; Joseph A. Brown

[57] ABSTRACT

A crop harvesting header and power unit or tractor of a self-propelled windrower incorporate improved structure for attaching the header to the tractor. The improved structure includes a saddle bracket fixed to an outer end of each of a pair of laterally spaced apart lower lift arms pivotally mounted on the forward end of the tractor and a spacer sleeve mounted to each of a pair of correspondingly spaced apart lower portions of the header. Each header sleeve may readily be seated within a respective one of the saddle brackets on the lower lift arms by the tractor operator manipulating the position of the lower lift arms and maneuvering the tractor. The improved attaching structure further includes a front lip formed on each saddle bracket which will overlie a retaining pin insertably mounted in each respective lower header portion by the operator adjacent each header sleeve after the sleeve has been seated in its corresponding lift arm saddle bracket. When the lift arms are pivoted upwardly or downwardly to raise or lower the header with respect to the ground, each saddle bracket rotates about its respective spacer sleeve and moves relative to its adjacently positioned retaining pin such that the pin, in effect, follows the contour of the lower, outer surface of the saddle bracket and its lip to thereby maintain the sleeve in seated relationship with the saddle.

7 Claims, 3 Drawing Figures

HEADER ATTACHMENT STRUCTURE

BACKGROUND OF THE INVENTION

1. Field of the Invention

The present invention relates generally to crop material harvesting machines and, more particularly, is concerned with improved structure for facilitating quick and easy attachment of a crop harvesting header to the mobile frame of the machine.

2. Description of the Prior Art

Some crop harvesting machines, such as self-propelled windrowers or the like, utilize a header which has a length of twelve or more feet for harvesting wide swaths of standing crop. However, because of legal highway width restrictions in most localities, a header of such size must be road transported to and from the field separately from the mobile power unit or tractor. Thus, it is desirable to be able to easily attach and detach the header to and from the tractor.

The header is commonly mounted to the tractor by a suspension assembly which includes upper and lower lift arms pivotally interconnecting and extending between the tractor and the header and resilient springs usually positioned between the tractor and the lower lift arms or some lower part of the header itself for providing flotation of the header from the tractor. Such mounting arrangement is disclosed and illustrated in U.S. Pat. Nos. 3,589,115 and 3,699,754.

The suspension assembly remains with the tractor and, therefore, heretofore, the header has been attached to or detached from the tractor by fastening or unfastening bolts which have been inserted through aligned holes formed in the lower header portions and the outer ends of the lower lift arms.

However, attachment of the header to the tractor, as accomplished heretofore, has been particularly time-consuming and involves the attention of at least two persons in that alignment of the respective holes in the lower arm outer ends and in the mounting brackets on the lower header portions must be sighted by one person while another person skillfully maneuvers the tractor and accurately vertically positions the lower lift arms, then a bolt must be inserted through each set of aligned holes and finally a nut fastened on each bolt.

SUMMARY OF THE INVENTION

The improved structure of the present invention makes header attachment to the tractor quick and easy by eliminating the need to align such holes, insert bolts therethrough and fasten nuts to the bolts. Consequently, the labor of only one person is required to carry out header attachment.

According to the present invention, a crop harvesting header at lower portions thereof and lower lift arms of the tractor's header suspension system are each respectively provided with complementary first and second attaching means or elements which may be aligned in seated relationship, with each of the second elements underlying a respective one of the first elements, merely through manipulation of the vertical position of the lower arms and maneuvering of the tractor by the operator, without actual sighting of the elements by anyone.

Further, there is provided means mountable in the lower header portions in underlying relationship to the second attaching elements so as to retain the respective first and second elements in their seated relationship. Specifically, such mountable means includes a third element in the form of a pin which is insertably mounted through respective pairs of holes in the lower header portions so as to underlie a lip fixed on each of the second elements such that each of the second elements of the lower lift arms are maintained in their respective seated relationships with one of the first elements of the lower header portions while, at the same time, the lower lift arms are not restricted in their ability to pivot relative to the header during flotation thereof or vertical lifting thereof relative to the field during field operation of the machine.

More particularly, each of the lower arm second elements comprises an arcuate-shaped saddle bracket provided on the outer end of each lower lift arm which seats under the bottom side a respective one of the first elements being comprised by a cylindrical bearing or spacer sleeve fixed between a pair of spaced mounting plates at each of two spaced apart lower header portion locations. Each bearing axially extends parallel to the axis of the pivotal connection of each lower lift arm to the tractor. Further, each saddle bracket has a forwardly-protruding lip which extends above the retaining pin when the header is disposed in its lower position adjacent the field. Such overlying relationship of the lip on the saddle bracket with the pin prevents disengagement or unseating of saddle bracket from the bearing. Also, as the header is raised, the lower lift arms pivot at their respective saddle brackets with respect to the bearings with the retaining pins following the bottom contour of the respective saddle brackets to maintain the seated relationship between the respective saddle brackets and bearings.

These and other advantages and attainments of the present invention will become apparent to those skilled in the art upon a reading of the following detailed description when taken in conjunction with the drawings in which there is shown and described an illustrative embodiment of the invention.

BRIEF DESCRIPTION OF THE DRAWINGS

In the course of the following detailed description reference will be frequently made to the attached drawings in which.

DETAILED DESCRIPTION OF THE INVENTION

In the following description, right hand and left hand references are determined by standing at the rear of the machine and facing in the direction of forward travel. Also, in the following description, it is to be understood that such terms as "forward," "left," "upwardly," etc., are words of convenience and are not to be construed as limiting terms.

IN GENERAL

Figure 1:
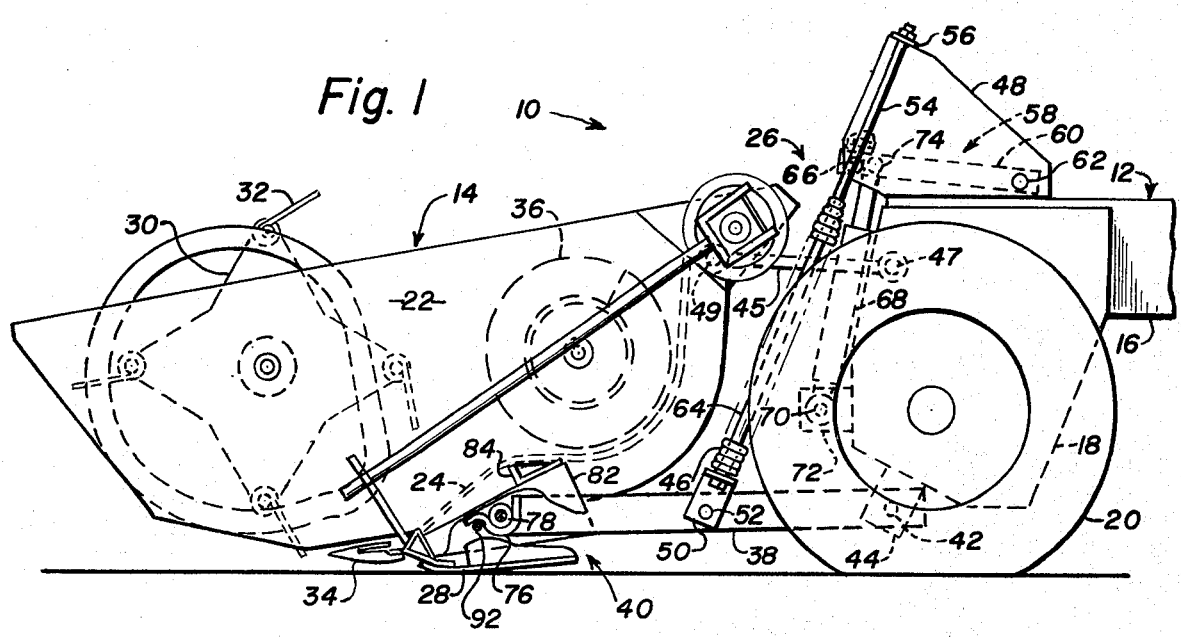
FIG. 1 is a fragmentary left side elevational view of a crop harvesting machine incorporating an improved structure for attaching the lower lift arms to the machine header constructed in accordance with the principles of the present invention and showing the machine header in a lowered position.

Referring now to the drawings, and particularly to FIG. 1, there is partially shown a crop harvesting machine, such as a self-propelled windrower, generally indicated by numeral 10, incorporating the principles of the present invention (the forward left side of the machine being shown in FIG. 1 when one is standing to the rear of the machine and facing in the direction of forward travel). While the machine 10 is of the self-propelled type, the improved structure incorporated therein may just as readily be incorporated into a pull-type machine.

The machine 10 is provided with a mobile frame, generally designated 12, which is commonly referred to as a power unit or tractor and adapted to move forwardly across a field. An elongated header 14 is disposed forwardly of the tractor 12 and extends transversely to the forward direction for harvesting crop material from the field as the tractor 12 advances forwardly.

The tractor 12 includes a main frame portion 16 with a pair of laterally spaced rear castor-type wheels (not shown) depending from the rear end thereof (not shown). Depending from the front end of the main frame portion 16 is a pair of laterally spaced front wheel gear housings 18 (only the left housing being shown in FIG. 1), each gear housing 18 rotatably mounting a front wheel 20 (only the left wheel being shown in FIG. 1) on its outer side. The tractor 12 further includes a power source (not shown) mounted adjacent the rear end thereof and suitable known drive components (not shown) for transmitting power to the front wheels 20 and the header 14. For a more complete understanding of the arrangement of the power source and drive components, attention is directed to U.S. Pat. Nos. 3,699,754 and 3,777,833. A more detailed description of such features need not be presented herein for a complete understanding of the present invention.

The header 14 includes a pair of vertical side sheets 22 (only the left one being shown in FIG. 1) and a curved floor 24 extending laterally therebetween. Centrally defined in a rear vertical portion of the floor 24 is a generally rectangular discharge opening (not shown). As will be subsequently described in greater detail, the header 14 is adapted for flotation on the field by a suspension system, generally designated by numeral 26, which supports most of the weight of the header 14. The remaining weight of the header 14 is supported on the field by a pair of ground engaging skid shoes 28 (only the left one being shown in FIG. 1) fixed to the lower outside portions of the header 14.

Further, the header 14 includes a transversely-extending reel 30 being rotatably mounted at its opposite ends forwardly between the header side sheets 22. The reel 30 is provided with a series of tines 32 laterally spaced about the periphery thereof and, as the reel 30 is rotated in counterclockwise fashion, adapted to engage the oncoming standing crop and sweep it rearwardly over a cutterbar assembly 34 mounted at its opposite ends forwardly between the header side sheets 22 and along the forward edge of the header floor 24 at a transversely-extending position spaced below the reel 30 and just above the ground. Disposed behind the reel 30 is a transversely-extending auger 36 also being mounted at its opposite ends to the header side sheets 22 and adapted to receive the cut crop moved rearwardly up the floor 24 by the reel 30, consolidate it and discharge it into the discharge opening defined in the rear vertical portion of the floor 24. A conditioning unit (not shown) which is mounted in an underslung fashion beneath the forward end of the main frame portion 16 and between the front wheels 20 will receive the crop material moved rearwardly through the header discharge opening, condition it and deposit it in a windrow back on the field. Such arrangement of the conditioning unit is disclosed in greater detail in U.S. Pat. No. 3,699,754. A more detailed description of such arrangement need not be presented herein for a complete understanding of the present invention.

As briefly mentioned hereinabove, the header 14 is adapted for flotation on the field by a suspension system 26 which pivotally mounts the header 14 from the tractor 12. The suspension system 26 includes a pair of laterally spaced apart lower lift arms 38 (only the left one being shown in FIG. 1). The lower arms 38 at their forward ends are pivotally connected to respective lower, laterally spaced portions of the header 14 by the improved structure of the present invention, generally designated by numeral 40, and extend rearwardly therefrom to rearward ends, each of which being pivotally connected at 42 respectively to a mounting bracket 44 fixed to each of the front wheel gear housings 18.

The suspension system 26 further includes a stabilizing bar 45 being centrally located, extending between and pivotally interconnecting at 47 and 49, respectively, the forward end of the main frame portion 16 and an upper central portion of the header 14.

To facilitate flotation, the suspension system 26 also includes a pair of spaced apart resilient springs 46 connected between each of the lower lift arms 38 and a pair of laterally spaced mounting plates 48 being fixed at each front side of the main frame portion 16 just above the respective front wheel gear housings 18. Each pair of springs 46 are connected at their lower ends to a T-shaped bracket 50 which is pivotally connected at 52 to a corresponding lower lift arm 38 intermediately along its longitudinal extent. Each spring pair 46 extends from the bracket 50 upwardly to a point near the lower front edge of the corresponding pair of mounting plates 48 where a bolt assembly 54 provided on the upper end of each spring 46 of each pair thereof extends further upwardly and attaches to a transverse bracket member 56 which is fixed across the front upper edges of each pair of plates 48. Therefore, by adjusting the bolt assembly 54 of each spring 46, the tension of each spring may be varied thereby providing adjustment to the floatation characteristics of the suspension system.

A lift mechanism 58 is also incorporated by the machine 10 for vertically pivotally moving the header 14 from its lower position, as seen in FIG. 1, wherein it is disposed for field operation, to a raised non-operating position. The mechanism 58 includes an upper lift arm 60 (only the left one being shown in FIG. 1) connected at 62 between each pair of plates 48 for pivotal movement about a transverse axis. Each upper lift arm 60 is connected with a corresponding lower lift arm 38 by a connecting link 64, each connecting link 64 extending longitudinally between and parallel to, the springs 46 in each one of the two pairs thereof and being fixed at its lower end to the T-shaped bracket 50 between the connection of the springs 46 with the bracket 50. Each connecting link 64 is further pivotally connected at its upper end at 66 to the front end of a corresponding one of the upper lift arms 60. The upper lift arms 60 are articulated up and down by a pair of hydraulic cylinders 68 (only the left one being shown in FIG. 1). Each cylinder 68 has its cylinder end pivotally anchored at 70 to a forwardly-extending bracket 72 being fixed to the front edge of a corresponding gear housing 18 and has its piston rod end pivotally secured at 74 to a front end of a corresponding upper lift arm 60 adjacent pivotal connection 66 of the upper end of the corresponding connecting link 64 to such upper lift arm 60. Thus, by extension of the cylinders 68, the upper lift arms 60 are moved upwardly, causing the lower lift arms 38 to lift the header 14 correspondingly. By relieving the hydraulic pressure on each cylinder 68, it is allowed to retract due to the weight of the header 14 and the header 14 will return to its lower position.

IMPROVED HEADER ATTACHING STRUCTURE

As briefly mentioned above, the lower lift arms 38 are pivotally connected at their forward ends to respective lower, laterally spaced portions of the header 14 by improved attaching structure 40. Such structure includes complementary first and second elements 76, 78 respectively mounted on the outer end of each of the arms 38 and on each of the corresponding lower header portions.

Figure 2:
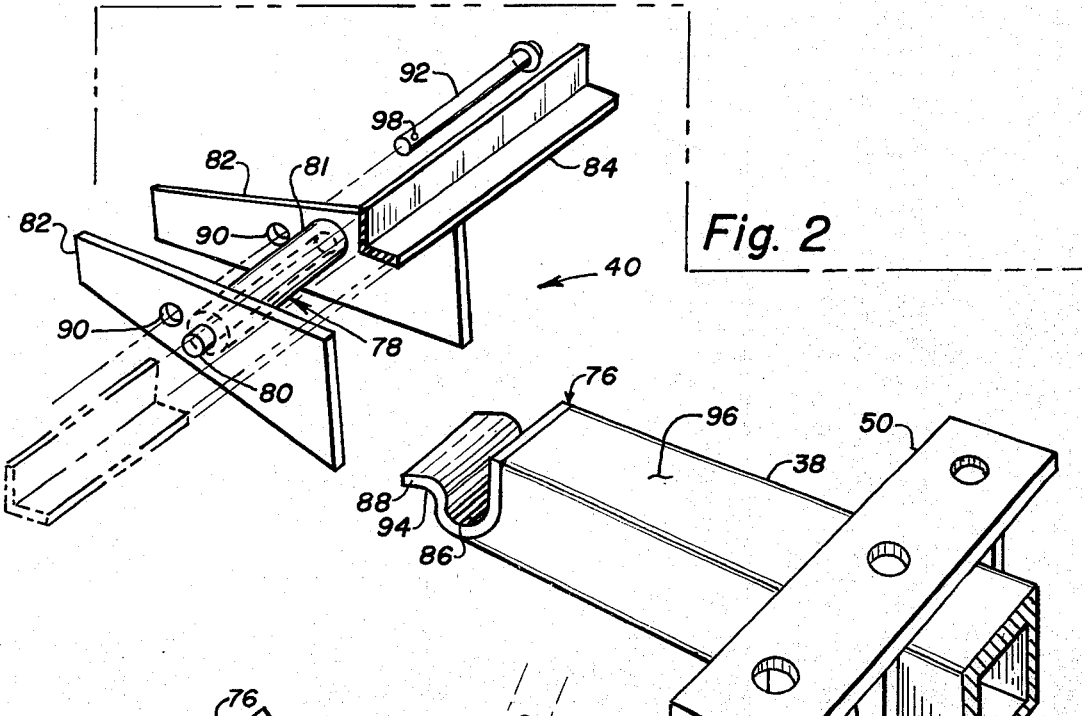
FIG. 2 is an perspective, exploded view of one of the lower lift arms and the improved attaching structure associated therewith, on a larger scale than that of FIG. 1.

Referring now to FIG. 2, the first element 76 mounted on each of the arms 38 (only one of the arms 38 and the element 76 associated therewith being shown) comprises an arcuately-shaped saddle bracket 76 being fixedly mounted to the forward or outer end of the arm 38. The complementary second element comprises a cylindrical bearing 78 formed by a shaft section 80 surrounded by a spacer sleeve 81 and being mounted between a pair of spaced apart mounting plates 82 being respectively fixed to, and extending downwardly from, a lower transversely-extending structural member 84 of the header 14 at locations adjacent to, and inwardly of, the skid shoes 28. Each saddle bracket 76 has an upper opening through which to receive a corresponding one of the bearings 78. Furthermore, the arcuate shape of each saddle bracket 76 generally defines a partial cylindrical inner surface 86 upon which a corresponding one of the bearings 78 will seat in overlying relationship to the saddle bracket 76 such that the saddle bracket 76 surrounds the bottom round side of the bearing 78 in substantially concentric relationship.

Figure 3:
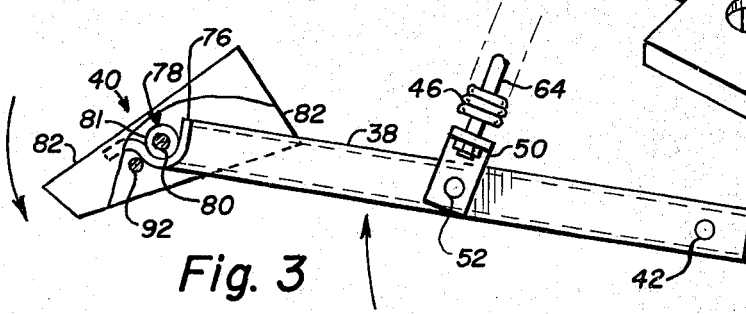
FIG. 3 is an enlarged, side elevational view of one lift arm and the improved attaching structure associated therewith, showing the relative positions thereof when the header has been vertically lifted toward a raised position.

Further, the attaching structure 40 includes a forwardly-protruding and downwardly-curved lip 88 formed on each of the saddle brackets 76, a hole 90 defined in each plate 82 of each respective pair thereof and a third element in the form of a retaining pin 92 for insertion through each of the pairs of holes 90. The holes 90 of each pair thereof are aligned with one another and spaced forwardly and downwardly from a corresponding one of the bearings 78 such that when each retaining pin 92 is inserted through its respective pair of holes 90, it will extend along and below the lower, outer surface 94 of a corresponding one of the lips 88. By such arrangement, each of the pins 92 will maintain its associated one of the arcuately-shaped saddle brackets 76 and bearings 78 in seated relationship. Also, when the header 14 is either abruptly caused to move upwardly upon encountering a field obstacle or deliberately raised by actuation of the hydraulic lift cylinders 68 (or, on the other hand, when the header is lowered) with the lower lift arms 38 pivoting at point 42 with respect to the tractor 12 and also at their saddle brackets 76 with respect to the bearings 78 of the lower header portions, as seen in FIG. 3, the retaining pins 92 will, in effect, follow the cylindrical contour of the respective outer surfaces 94 of the lips 88 and the saddle brackets 76, and, thereby maintain the seated relationship between the respective saddle brackets 70 and bearings 78. Thus, the attaching structure 40 does not sacrifice or restrict the ability of the lower lift arms 38 to pivot as the header 14 is raised or lowered.

THE HEADER ATTACHMENT OPERATION

As mentioned hereinbefore, the attaching structure 40 on the lower lift arms 38 and the header 14 facilitates quick and easy attachment of the header 14 to the tractor 12 by only the operator. First, the operator adjusts the bolt assemblies 54 so as to position the lower lift arms 38 adjacent the ground. Then, by maneuvering the tractor 12, the operator may from the tractor platform visually align the forward ends of the arms 38 between the pairs of plates 82 and then drive the tractor 12 forwardly to place the forward ends of the lower arms 38 generally under the bearings 78 such that the saddle brackets 76 are aligned and seated with the bearings 78. If the operator has not achieved such seated alignment, he may actuate the cylinders 68 to pivot the lower arms 38 upwardly until the top surfaces 96 of the arms 38 are brought into pressurized contact with the bottoms of the bearings 78. Then, he may slowly back the tractor 12 away from the header 14 until he "feels" the arcuate saddle brackets 76 on the ends of the lower arms 38 seat with the bearings 78. Once seating has been accomplished, the operator must climb down off the tractor 12 and insert the retaining pins 92 through the pairs of holes 90. Also, a locking key is inserted through the transverse bore 98 formed through the outer end of each pin 92 to maintain the pins 92 in their insert positions. Finally, the upper stabilizing bar 48 must be connected to the upper central portion of the header 14 and the bolt assemblies 54 readjusted to provide proper flotation characteristics for resilient springs 46.

Detachment of the header 14 from the tractor 12 is accomplished by generally reversing the above-described steps.

It is though that the invention and many of its attendant advantages will be understood from the foregoing description and it will be apparent that various changes may be made in the form, construction and arrangement of the parts of the improved attaching structure described without departing from the spirit and scope of the invention or sacrificing all of its material advantages, the form hereinbefore described being merely an exemplary embodiment thereof.

Having described my invention, what is claimed is:

1. In a crop harvesting machine having a mobile frame adapted to move across a field, a crop harvesting header and means for suspending said header from said frame so as to dispose said header in a harvesting position adjacent the field and provide vertical flotation of said header with respect to the field with said suspending means including elongated means mounted on said frame and extending outwardly therefrom, improved structure for attaching an outer end of said elongated means to said header, comprising:

first attaching means mounted to said header;

second attaching means mounted to said outer end of said elongated means of said header suspending means and having an upper opening through which to receive said first attaching means in a seated relationship therein such that a portion of said second attaching means surrounds and underlies a lower side of said first attaching means; and means mountable in said header in underlying relationship to said second attaching means so as to retain said first attaching means and said second attaching means in said seated relationship.

2. The machine as recited in claim 1, wherein:

said first attaching means has a cylindrical outer surface; and said portion of said second attaching means is arcuately-shaped so as to define a partial cylindrical inner surface upon which said first attaching means seats at said lower side of said cylindrical outer surface thereof.

3. The machine as recited in claim 1, wherein:

said second attaching means includes another portion which protrudes from said portion thereof which is disposed in said seated relationship with said first attaching means; and said mountable means is mountable in said header so as to underlie said another portion of said second attaching means.

4. In a crop harvesting machine having a mobile frame adapted to move across a field, a crop harvesting header and means for pivotally suspending said header from said frame so as to dispose said header in transverse relationship to the direction of frame movement and in a harvesting position adjacent the field and provide vertical flotational movement of said header with respect to the field with said suspending means including at least one elongated lower lift arm mounted on said frame for vertical pivotal movement and extending outwardly therefrom, improved structure for attaching an outer end of said lower lift arm to said header, comprising:

at least one cylindrical bearing mounted to a lower portion of said header and axially extending generally parallel to said transverse relationship of said header to said frame;

a saddle bracket mounted to said outer end of said lower lift arm, said bracket having an upper opening through which to receive said bearing and an arcuate structure which generally defines a partial cylindrical inner surface on said bracket upon which a lower side of said cylindrical bearing seats within said bracket in overlying relationship thereto such that said bracket surrounds said lower side of said bearings in substantially concentric relationship; and a pin insertably mounted in said lower header portion in underlying relationship to said bracket so as to retain said saddle bracket and said bearing in their seated relationship.

5. The machine as recited in claim 4, wherein said saddle bracket will rotate relative to said bearing upon vertical pivotal movement of said lower lift arm and vertical flotational movement of said header.

6. The machine as recited in claim 4, wherein said saddle bracket includes a lip protruding therefrom; and said pin is insertably mounted in said lower header portion in underlying relationship to said lip so as to retain said saddle bracket and said bearing in their seated relationship.

7. The machine as recited in claim 6, wherein said arcuate structure of said bracket further generally defines a partial cylindrical outer surface on said bracket which extends adjacent to said lip thereon and said pin such that during rotation of said bracket relative to said bearing, upon vertical pivotal movement of said lower lift arm and vertical flotational movement of said header, said pin, in effect, follows the contour of said outer surface of said bracket to thereby maintain said bearing and bracket in said seated relationship.

* * * * *